UNITED STATES PATENT OFFICE.

ALBERT O'CONNOR, OF DETROIT, MICHIGAN.

NUT-LOCK.

1,379,415.  Specification of Letters Patent.  Patented May 24, 1921.

Application filed October 11, 1920. Serial No. 416,272.

*To all whom it may concern:*

Be it known that I, ALBERT O'CONNOR, a subject of the King of Great Britain and Ireland, residing at Detroit, in the county of Wayne and State of Michigan, have invented certain new and useful Improvements in Nut-Locks, of which the following is a specification, reference being had therein to the accompanying drawings.

The invention relates to nut locks and consists in the construction as hereinafter set forth.

In the drawings:

Figure 1 is an elevation of a bolt and nut showing the locking device applied thereto;

Fig. 2 is a longitudinal section on line 2—2 of Fig. 1;

Fig. 3 is an end elevation.

A is a bolt or other threaded member, and B is a nut in engagement therewith. C is the nut locking device which consists essentially in a sheet metal blank having an entrance slot D therein of a width slightly less than the diameter of the threaded portion of the bolt at the bottom of the threads. As shown, the member C is of a U-shaped form having the parallel portions thereof extended more than the width of the nut so as to provide bendable end portions that may be turned down adjacent to the side of the nut.

To apply the lock to the nut, the bolt is transversely slotted at one side and at the bottom of the thread, as indicated at E, a sufficient amount to permit said bolt to enter the slot D. This slot E is so located as to be adjacent to the outer face of the nut when the latter has been tightened, so that by engaging the member C with the bolt it will lie adjacent to its outer face. The bendable end portions F are then turned down, as indicated in Fig. 1, which will prevent turning of the nut. Thus the locking is effected, first, by the engagement of the member C with the slot E which prevents outward movement of said member C, and second, due to the fact that the member C is prevented from rotating and when the ends F are bent into engagement with the nut, the nut also will be held from rotation. The construction therefore forms an effective lock and one which can be manufactured at small expense and easily applied.

While I have specifically shown and described a locking device of U form having two prongs which are bent over into engagement with the nut, it is evident that the locking could be effected with a single bent prong, which would be sufficient to hold the member in the slot E and to prevent the nut from turning. It is, however, essential that the member C should embrace both sides of the bolt and have the entrance slot for engagement with the bolt.

What I claim as my invention is:

1. The combination with a threaded member and a nut for engaging the same, of a locking device formed of sheet metal having a slot extending inwardly from one side thereof of a width slightly less than the diameter of said threaded member at the bottom of the thread, said threaded member being provided with a single transverse slot adjacent to one face of the nut permitting the entrance thereof in the slot of the locking member, one side of which will lie parallel with the face of the nut and the other side of which will follow the channel of the thread at an angle thereto, one of said sides having a bendable portion for engaging the side of the nut.

2. The combination with a threaded member and a nut for engaging the same, of a locking device formed of a U-shaped sheet metal blank having the slot between the sides of the U of a width slightly less than the diameter of said threaded member at the bottom of the thread, said threaded member being provided with a single transverse slot adjacent to one face of the nut permitting the entrance thereof in the slot in the locking member, one side of which will lie parallel to the face of the nut and the other side of which will follow the channel of the thread at an angle to said face and both ends of said member having bendable portions for engaging the side of the nut to prevent turning thereof.

In testimony whereof I affix my signature.

ALBERT O'CONNOR.